United States Patent
Chang

(10) Patent No.: US 8,324,514 B2
(45) Date of Patent: Dec. 4, 2012

(54) MOUNTING DEVICE FOR ELECTRONIC COMPONENT AND ELECTRONIC APPARATUS USING THE SAME

(75) Inventor: Chin-Ming Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 314 days.

(21) Appl. No.: 12/886,545

(22) Filed: Sep. 20, 2010

(65) Prior Publication Data

US 2012/0012384 A1   Jan. 19, 2012

(30) Foreign Application Priority Data

Jul. 13, 2010   (TW) ................................ 99122924 A

(51) Int. Cl.
   *H05K 7/14*   (2006.01)
(52) U.S. Cl. .................................... 174/542; 174/138 G
(58) Field of Classification Search .................. 174/535, 174/542, 138 G
   See application file for complete search history.

(56) References Cited

U.S. PATENT DOCUMENTS

| | | | | |
|---|---|---|---|---|
| 6,377,445 B1 * | 4/2002 | Davis et al. | .................... | 361/752 |
| 6,424,538 B1 * | 7/2002 | Paquin | ........................... | 361/752 |
| 6,535,394 B1 * | 3/2003 | Hirzmann | ..................... | 361/761 |
| 6,813,161 B2 * | 11/2004 | Le et al. | ......................... | 361/758 |
| 7,119,276 B2 * | 10/2006 | Pav et al. | ....................... | 174/542 |
| 7,264,501 B1 * | 9/2007 | Lin et al. | ........................ | 439/571 |
| 8,053,683 B2 * | 11/2011 | Slocum et al. | ................ | 174/365 |
| 2006/0005992 A1 * | 1/2006 | Pav et al. | .................. | 174/138 G |

* cited by examiner

*Primary Examiner* — Hung Ngo
(74) *Attorney, Agent, or Firm* — Altis Law Group, Inc.

(57) ABSTRACT

A mounting device includes a mounting plate and a mounting frame. The mounting plate defines a plurality of mounting grooves and a latching hole therein. Each of the mounting grooves includes a receiving hole and a sliding slot communicating with each other. The mounting frame includes a plurality of hooks and a resilient tab. The resilient tab is provided with a blocking portion. Each of the hooks is received in a corresponding mounting groove through the receiving hole of the mounting hole and slides in the sliding slot until the blocking portion of the resilient tab is received in the latching hole and the hook hooks on an edge of the sliding slot of the mounting groove. An electronic apparatus using the mounting device is also provided.

20 Claims, 3 Drawing Sheets

MOUNTING DEVICE FOR ELECTRONIC COMPONENT AND ELECTRONIC APPARATUS USING THE SAME

BACKGROUND

1. Technical Field

The disclosure generally relates to mounting devices, and particularly to a device for mounting an electronic component in an electronic apparatus.

2. Description of Related Art

Electronic apparatuses, such as a power supply of a computer, often comprises electronic components therein directly mounted on a side plate thereof by a plurality of screws. To install the screws on the side plate, a screwdriver is needed. In addition, considerable room is required to operate the screwdriver in the electronic apparatus. Therefore, the manner in which electronic components are directly mounted presents numerous limitations.

In addition, a major trend in information technology is the miniaturization of various electronic apparatuses. In many such small apparatuses, the inner space is crowded with components, increasing the likelihood of interference between a screwdriver and inner structures of the electronic apparatus. This may render installation and removal of certain electronic components highly inconvenient.

Accordingly, what is needed is a mounting apparatus which can overcome the limitations described.

BRIEF DESCRIPTION OF THE DRAWINGS

Many aspects of the embodiment(s) can be better understood with reference to the following drawings. The components in the drawings are not necessarily drawn to scale, the emphasis instead placed upon clearly illustrating the principles of the present disclosure. Moreover, in the drawings, like reference numerals designate corresponding parts throughout the views.

DETAILED DESCRIPTION

Figure 1:
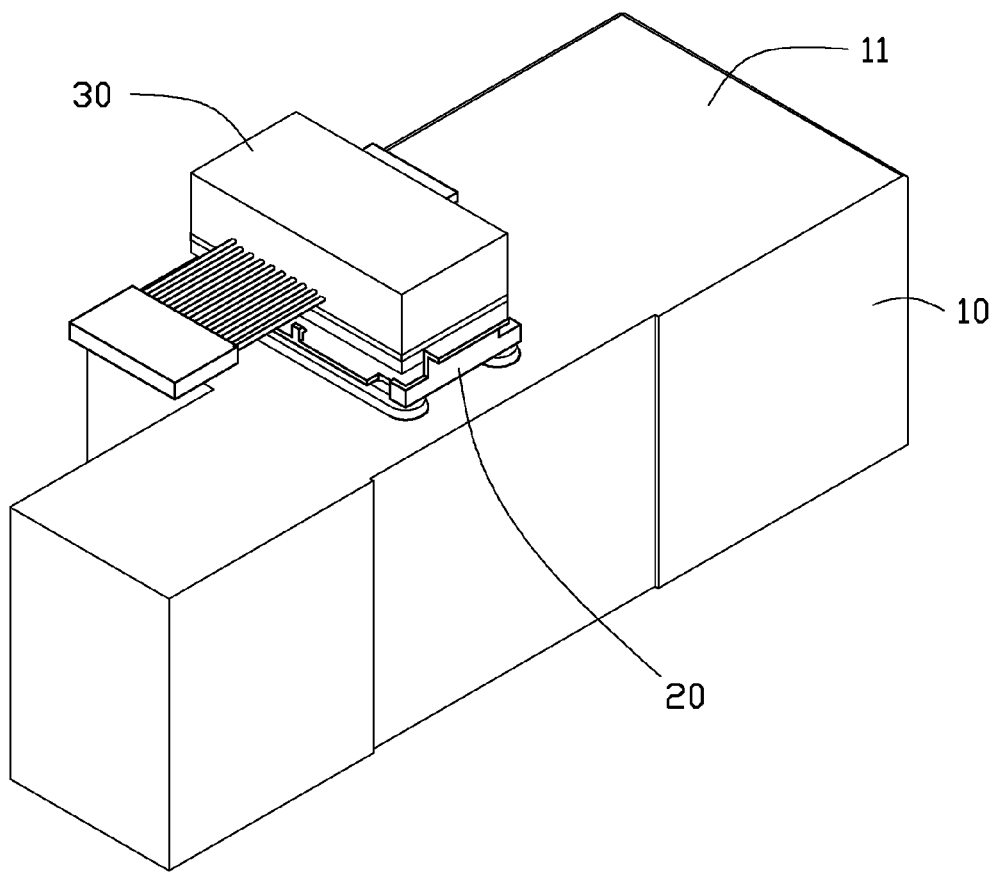
FIG. 1 is an isometric, assembled view of an electronic apparatus in accordance with an exemplary embodiment of the present disclosure.

Referring to FIG. 1, an electronic apparatus according to an exemplary embodiment of the present disclosure is shown. The electronic apparatus includes a case 10, a mounting frame 20 mounted on the case 10, and an electronic component 30 mounted on the mounting frame 20.

The case 10 includes a mounting plate 11 at a top side thereof. The mounting frame 20 is mounted on the mounting plate 11 of the case 10. The mounting frame 20 and the mounting plate 11 cooperatively form a mounting device for the electronic component 30. For clarity, in the embodiment, the electronic component 30 is mounted at an outside of the case 10.

Figure 2:
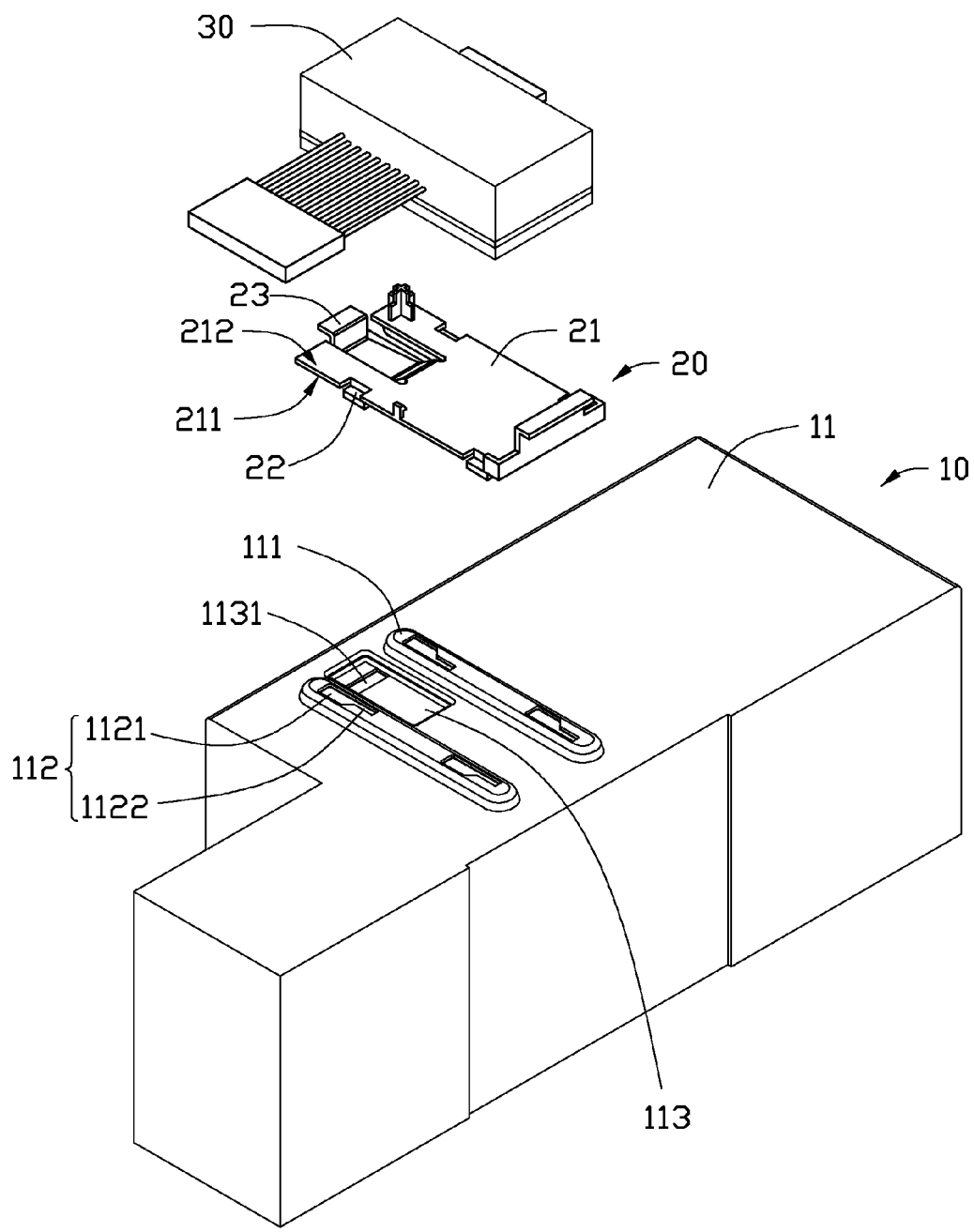
FIG. 2 is an exploded view of the electronic apparatus of FIG. 1.

Referring also to FIG. 2, two elongated projecting strips 111 protrude from an outer surface of the mounting plate 11, the projecting strips 111 spaced from and parallel to each other. Each of the projecting strips 111 is punched from an inside of the mounting plate 11 toward an outside of the mounting plate 11, whereby a groove (not visible) is correspondingly formed in an inner surface of each projecting strip 111. The projecting strip 111 defines two mounting grooves 112 in two opposite ends thereof, respectively. Each of the mounting grooves 112 is substantially P-shaped, including a receiving hole 1121 and a sliding slot 1122 communicating with each other end to end along a length of the projecting strip 111. The mounting grooves 112 of the two projecting strips 111 are located at four corners of an imaginary rectangle. The mounting grooves 112 of one of the two projecting strips 111 are symmetrical with the mounting grooves 112 of the other one of the two projecting strips 111 relative to an imaginary midline between the two projecting strips 111. A transverse width of the receiving hole 1121 is greater than that of the sliding slot 1122. A recess 113 is sunken from the outer surface of the mounting plate 11, between the two projecting strips 111. The recess 113 is rectangular and located adjacent to an end of each of the two projecting strips 111. A part of the outer surface of the mounting plate 11 at a bottom of the recess 113 defines a latching hole 1131 therein. The latching hole 1131 is rectangular.

Figure 3:
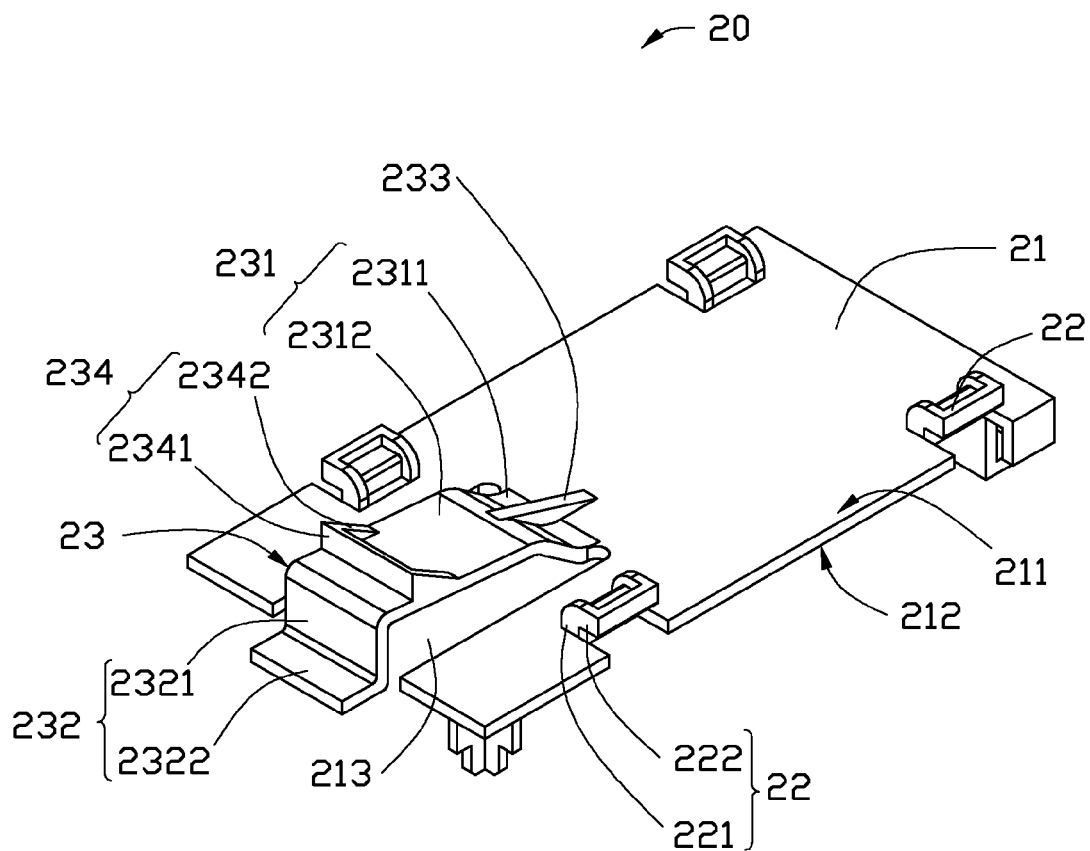
FIG. 3 is an enlarged, isometric view of a mounting frame of the electronic apparatus of FIG. 2, showing the mounting frame inverted.

Referring also to FIG. 3, the mounting frame 20 includes a rectangular base plate 21 and a resilient tab 23 formed on the base plate 21.

The base plate 21 is substantially rectangular, and includes a first mounting surface 211 and a second mounting surface 212 at opposite sides thereof. The first mounting surface 211 faces the mounting plate 11 of the case 10, and the second mounting surface 212 faces the electronic component 30. The first mounting surface 211 is provided with four hooks 22 at two opposite sides thereof. Each of the hooks 22 includes a neck portion 221 extending from the first mounting surface 211, and a hooking portion 222 extending from a free end of the neck portion 221. A width of the neck portion 221 is less than that of the sliding slot 1122 of the mounting groove 112. A width of the hooking portion 222 is less than that of the receiving hole 1121 of the mounting groove 112 of the mounting plate 11, and greater than that of the sliding slot 1122 of the mounting groove 112 of the mounting plate 11.

The base plate 21 defines a cutout 213 at a middle portion of a lateral side thereof. The resilient tab 23 is located in the cutout 213. The resilient tab 23 includes a resilient portion 231 and an operating portion 232. The resilient portion 231 includes a connecting plate 2311 angling obliquely downward from the base plate 21 towards the cutout 213, and a planar plate 2312 extending from a free end of the connecting plate 2311 in a direction parallel to the base plate 21. A rib 233 is provided on a bottom surface of the connecting plate 2311. The rib 233 is triangular and extends from the first mounting surface 211 to the bottom surface of the connecting plate 2311, reinforcing a mechanical strength of the connecting plate 2311. The planar plate 2312 is provided with a blocking portion 234 at a bottom surface thereof. The blocking portion 234 includes an abutting plate 2341 depending from the bottom surface of the planar plate 2312, and two side plates 2342 formed at two opposite sides of the abutting plate 2341. The two side plates 2342 are parallel, and reinforce a mechanical strength of the abutting plate 2341. The operating portion 232 includes a drive plate 2321 extending upwardly from a free end of the planar plate 2312, and a handle plate 2322 extending outwardly from a free end of the drive plate 2321.

The second mounting surface 212 of the base plate 21 is used for seating the electronic component 30. The second mounting surface 212 can be designed with different mounting structures according to a structure of the electronic component 30, such that the electronic component 30 can be conveniently mounted to the mounting structures of the mounting frame 20.

In assembly of the mounting apparatus, the hooking portion 222 of each hook 22 of the mounting frame 20 is aligned with the receiving hole 1121 of a corresponding mounting groove 112 of the mounting plate 11. The blocking portion 234 of the resilient tab 23 abuts the bottom of the recess 113 of the mounting plate 11. The mounting frame 20 is pushed toward the mounting plate 11 such that the hook 22 is received in the receiving hole 1121 of the mounting groove 112. The resilient tab 23 deforms accordingly, and the mounting frame 20 approaches the sliding slot 1122 of the mounting groove 112 of the mounting plate 11 such that the neck portion 221 of the hook 22 is received in the sliding slot 1122 of the mounting groove 112 until the blocking portion 234 of the resilient tab 23 slides along the bottom of the recess 113 and is received in the latching hole 1131 of the recess 113 of the mounting plate 11. The hooking portion 222 of the hook 22 of the mounting frame 20 hooks on an edge of the sliding slot 1122 of the mounting groove 112 of the mounting plate 11. The planar plate 2312 of the resilient tab 23 of the mounting frame 20 is received in the recess 113 of the mounting plate 11 of the case 10. The abutting plate 2341 of the blocking portion 234 abuts an inner wall of the latching hole 1131 to prevent movement of the mounting frame 20.

In disassembly of the mounting apparatus, the handle plate 2322 of the resilient tab 23 is moved upward and away from the mounting plate 11 such that the blocking portion 234 of the resilient tab 23 is withdrawn from the latching hole 1131 of the mounting plate 11. The mounting frame 20 is pushed toward the receiving hole 1121 of the mounting groove 112 such that neck portion 221 of each hook 22 is received in the receiving hole 1121 of the corresponding mounting groove 112. At this stage, the mounting frame 20 is easily removed from the mounting plate 11.

In the embodiment, the mounting frame 20 is assembled on or disassembled from the mounting plate 11 through a simple operation, with no requirement for additional tools. The electronic component 30 can be preassembled on the second mounting surface 212 of the mounting frame 20 before the mounting frame 20 is assembled to the case 10. When the mounting frame 20 is mounted on the mounting plate 11 of the case 10, considerable operation space in the case 10 is not required. This provides the mounting apparatus with good adaptability in electronic apparatuses of limited size and volume.

It is to be understood, however, that even though numerous characteristics and advantages of the present embodiment(s) have been set forth in the foregoing description, together with details of the structures and functions of the embodiment(s), the disclosure is illustrative only, and that changes may be made in detail, especially in matters of shape, size, and arrangement of parts within the principles of the embodiment(s) to the full extent indicated by the broad general meaning of the terms in which the appended claims are expressed.

What is claimed is:

1. A mounting device for an electronic component, the mounting device comprising:
   a mounting plate defining a plurality of mounting grooves and a latching hole therein, each of the mounting grooves comprising a receiving hole and a sliding slot communicating with each other; and
   a mounting frame comprising a plurality of hooks and a resilient tab, the resilient tab provided with a blocking portion, each of the hooks received in a corresponding mounting groove through the receiving hole of the mounting groove and sliding in the corresponding sliding slot until the blocking portion of the resilient tab is received in the latching hole and the hook hooks on an edge of the sliding slot of the mounting groove.

2. The mounting device of claim 1, wherein the mounting frame comprises a base plate comprising a first mounting surface and a second mounting surface at an opposite sides thereof, wherein the plurality of hooks and the resilient tab are formed on the first mounting surface of the base plate, and the second mounting surface is configured for mounting an electronic component thereon.

3. The mounting device of claim 2, wherein the hook comprises a neck portion extending from the first mounting surface and a hooking portion extending from a free end of the neck portion, wherein the neck portion is slideable along the sliding slot of the mounting groove, and the hooking portion can hook the edge of the sliding slot of the mounting groove.

4. The mounting device of claim 3, wherein two elongated projecting strips are formed on the mounting plate, in which the mounting grooves are defined.

5. The mounting device of claim 4, wherein the latching hole is defined between the two projecting strips and located adjacent an end of each of the two projecting strips.

6. The mounting device of claim 5, wherein a recess is defined between the two projecting strips, in a bottom of which the latching hole is defined, and in which a portion of the resilient tab is received.

7. The mounting device of claim 6, wherein the resilient tab comprises a connecting plate angling obliquely from the base plate and a planar plate extending from a free end of the connecting plate, wherein the blocking portion is formed on the planar plate, and the planar plate is received in the recess of the mounting plate.

8. The mounting device of claim 7, wherein the blocking portion comprises an abutting plate depending from the planar plate and two side plates formed at two opposite sides of the abutting plate.

9. The mounting device of claim 7, wherein the resilient tab further comprises a drive plate extending from a free end of the planar plate and a handle plate formed at a free end of the drive plate.

10. The mounting device of claim 7, wherein the base plate defines a cutout therein, into which the resilient tab extends from the base plate.

11. An electronic apparatus comprising:
    an electronic component;
    a case with a mounting plate formed thereon, the mounting plate defining a plurality of mounting grooves and a latching hole therein, each of the mounting grooves comprising a receiving hole and a sliding slot communicating with each other; and
    a mounting frame mounted on the mounting plate, the electronic component mounted on the mounting frame, the mounting frame comprising a plurality of hooks and a resilient tab, wherein the resilient tab is provided with a blocking portion, and each of the hooks is received in a corresponding mounting groove first through the receiving hole of the mounting groove and then by sliding in the sliding slot until the blocking portion of the resilient tab is received in the latching hole and the hook hooks on an edge of the sliding slot of the mounting groove.

12. The electronic apparatus of claim 11, wherein the mounting frame comprises a base plate comprising a first mounting surface and a second mounting surface at and opposite side thereof, wherein the plurality of hooks and the resilient tab are formed on the first mounting surface of the mounting frame, and the electronic component is mounted on the second mounting surface.

13. The electronic apparatus of claim 12, wherein the hook comprises a neck portion extending from the first mounting surface and a hooking portion extending from a free end of the neck portion, the neck portion is slideable along the sliding slot of the mounting groove and the hooking portion hooks on the edge of the sliding slot of the mounting groove.

14. The electronic apparatus of claim 13, wherein two elongated projecting strips are formed on the mounting plate, and the mounting grooves are defined in the two projecting strips.

15. The electronic apparatus of claim 14, wherein the latching hole is defined between the two projecting strips and located adjacent to an end of each of the two projecting strips.

16. The electronic apparatus of claim 15, wherein a recess is defined between the two projecting strips, in the bottom of which the latching hole is defined, and in which a portion of the resilient tab is received.

17. The electronic apparatus of claim 16, wherein the resilient tab comprises a connecting plate angling obliquely from the base plate and a planar plate extending from a free end of the connecting plate, the blocking portion is formed on the planar plate, and the planar plate is received in the recess of the mounting plate.

18. The electronic apparatus of claim 17, wherein the blocking portion comprises an abutting plate depending from the planar plate and two side plates formed at two opposite sides of the abutting plate.

19. The electronic apparatus of claim 17, wherein the resilient tab further comprises a drive plate extending from a free end of the planar plate and a handle plate formed at a free end of the drive plate.

20. The electronic apparatus of claim 17, wherein the base plate defines a cutout therein, and the resilient tab extends from the base plate into the cutout.

\* \* \* \* \*